United States Patent
McFarling

(10) Patent No.: US 7,350,025 B2
(45) Date of Patent: Mar. 25, 2008

(54) SYSTEM AND METHOD FOR IMPROVED COLLECTION OF SOFTWARE APPLICATION PROFILE DATA FOR PERFORMANCE OPTIMIZATION

(75) Inventor: Scott McFarling, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 373 days.

(21) Appl. No.: 10/770,182

(22) Filed: Feb. 2, 2004

(65) Prior Publication Data

US 2005/0172079 A1 Aug. 4, 2005

(51) Int. Cl.
*G06F 12/08* (2006.01)
(52) U.S. Cl. .................. 711/119; 711/145; 711/144; 711/167; 713/1
(58) Field of Classification Search ................ 711/145, 711/144, 156, 133, 119, 167; 713/1
See application file for complete search history.

(56) References Cited

U.S. PATENT DOCUMENTS

| | | | | |
|---|---|---|---|---|
| 5,740,406 A | * | 4/1998 | Rosenthal et al. | 711/169 |
| 6,014,728 A | * | 1/2000 | Baror | 711/133 |
| 6,338,120 B1 | * | 1/2002 | Hanley | 711/136 |
| 2003/0046493 A1 | * | 3/2003 | Coulson | 711/118 |
| 2005/0086437 A1 | * | 4/2005 | Modha | 711/133 |

OTHER PUBLICATIONS

"Usage Dependent Cache Replacement by Ring Partitioned Groupings", IBM Technical Disclosure Bulletin, Jun. 1972.*

* cited by examiner

*Primary Examiner*—Pierre-Michel Bataille
(74) *Attorney, Agent, or Firm*—Merchant & Gould P.C.

(57) ABSTRACT

The present invention is directed to a system and method for improved collection of application profile data for performance optimization. The invention provides a mechanism for storing usage bits within the hardware cache of a computing device. These usage bits provide profile data by tracking the memory usage data. In one embodiment, the present invention also provides usage bits for each level of a multi-stage hardware cache to provide multi-stage usage tracking.

22 Claims, 5 Drawing Sheets

SYSTEM AND METHOD FOR IMPROVED COLLECTION OF SOFTWARE APPLICATION PROFILE DATA FOR PERFORMANCE OPTIMIZATION

BACKGROUND OF THE INVENTION

Automatic optimization techniques for software programs are becoming a more prevalent method for optimizing programs. Often, optimization of a program requires that the behavior of the program be monitored during execution. Monitoring the application during execution allows information to be gathered about the program's performance. Various techniques are used to gather this information. Once the information is gathered, the data may be used to optimize the program for future performance enhancement.

Some techniques for optimizing a program are simply referred to as Profile-Based Optimization (PBO) techniques. This set of techniques allow programs to be optimized more fully than when a program is not analyzed during execution. When a PBO technique is used for analyzing and optimizing a program, a consideration of the effectiveness of the technique is how much of the program was tested/analyzed. One type of profiling allows the parts of the program that are covered by the test to be discovered, so that the effectiveness of the PBO technique may be determined.

Typically, profiling is done in two alternate ways. The first is to use instrumentation. In an instrumentation approach, the program is modified so that it produces the profile information as it executes. The instrumentation approach therefore requires the program to be modified. Extra instructions are inserted within the program to compute and store the profile information. A burden therefore lies on the programmer to generate a new version of the program that needs to be installed and otherwise handled specially. Depending on the type of profile information desired, the instrumented program may run significantly slower (e.g., between 2 and 50 times slower) than the original.

The second profiling alternative is to statistically sample the program's behavior. Typically, in a sampling approach, a hardware timer is used to interrupt the program as it is running and the state at the interruption point is inspected to determine what instruction is being executed. Sampling can be done on the normal released version of applications. In addition, the overhead can be made quite low by just increasing the interval between samples. While the sampling approach has many advantages, the information it produces is incomplete. Low frequency events can easily fall between sampling events and never be observed by the sampling process.

SUMMARY OF THE INVENTION

The present invention is substantially directed at a system and method for improved collection of application profile data for performance optimization. In particular, the present invention is directed at tracking the memory usage of a program. Caches of a computing device are the standard technique for accessing memory efficiently. Typical memory accesses occur through the cache. Accordingly, the memory usage of a program is efficiently tracked by monitoring the memory usage within the cache. In the present invention, the memory usage is tracked by usage bits that are set when a corresponding section of the cache is used by the program. The present invention provides for tracking the memory usage information during a normal run of the program. As constructed, the present invention does not require any special instrumentation, and yet still collects the complete information that may be obtained from an instrumented build.

DETAILED DESCRIPTION OF THE PREFERRED EMBODIMENT

The present invention is substantially directed at a system and method for improved collection of application profile data for performance optimization. The invention provides a mechanism for storing usage bits within the hardware cache of a computing device. The present invention also provides usage bits for each level of a multi-stage hardware cache to provide multi-stage usage tracking. These usage bits provide profile data by tracking the cache usage data. The present invention does not require any special instrumentation, and yet still collects the complete information that may be obtained from an instrumented build.

The following description is divided into two parts. The first part of the description describes an illustrative computing environment in which the present invention may operate. The second part of the description describes one illustrative implementation of the present invention.

Illustrative Computing Environment

Figure 1:
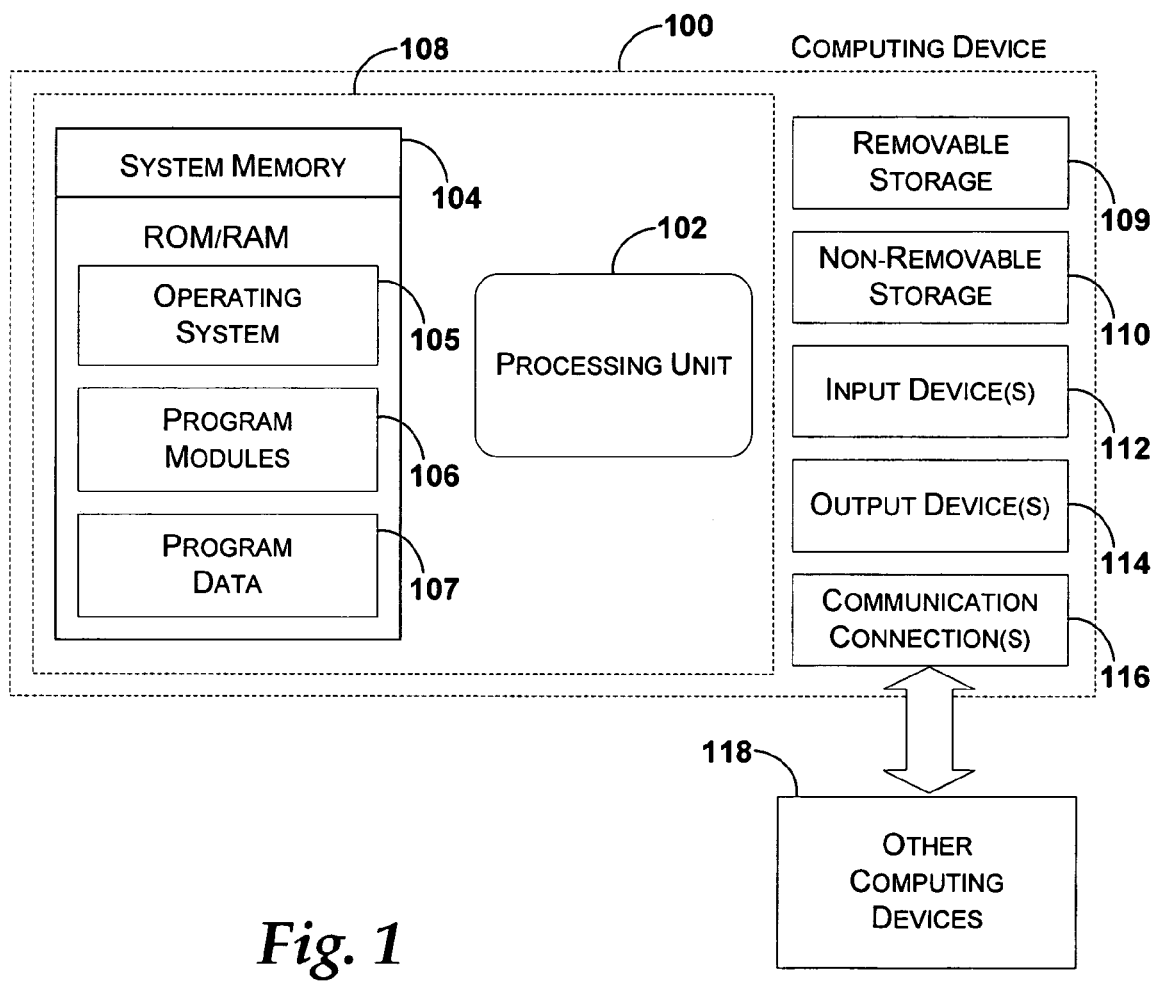
FIG. 1 illustrates an exemplary computing device that may be used in illustrative implementations of the present invention.

FIG. 1 illustrates an exemplary computing device that may be used in illustrative implementations of the present invention. With reference to FIG. 1, in a very basic configuration, computing device 100 typically includes at least one processing unit 102 and system memory 104. Depending on the exact configuration and type of computing device 100, system memory 104 may be volatile (such as RAM), non-volatile (such as ROM, flash memory, etc.) or some combination of the two. System memory 104 typically includes an operating system 105, one or more program modules 106, and may include program data 107. Examples of program modules 106 include a browser application, a finance management application, a word processor, and the like. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device 100 to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Implementation

Figure 2:
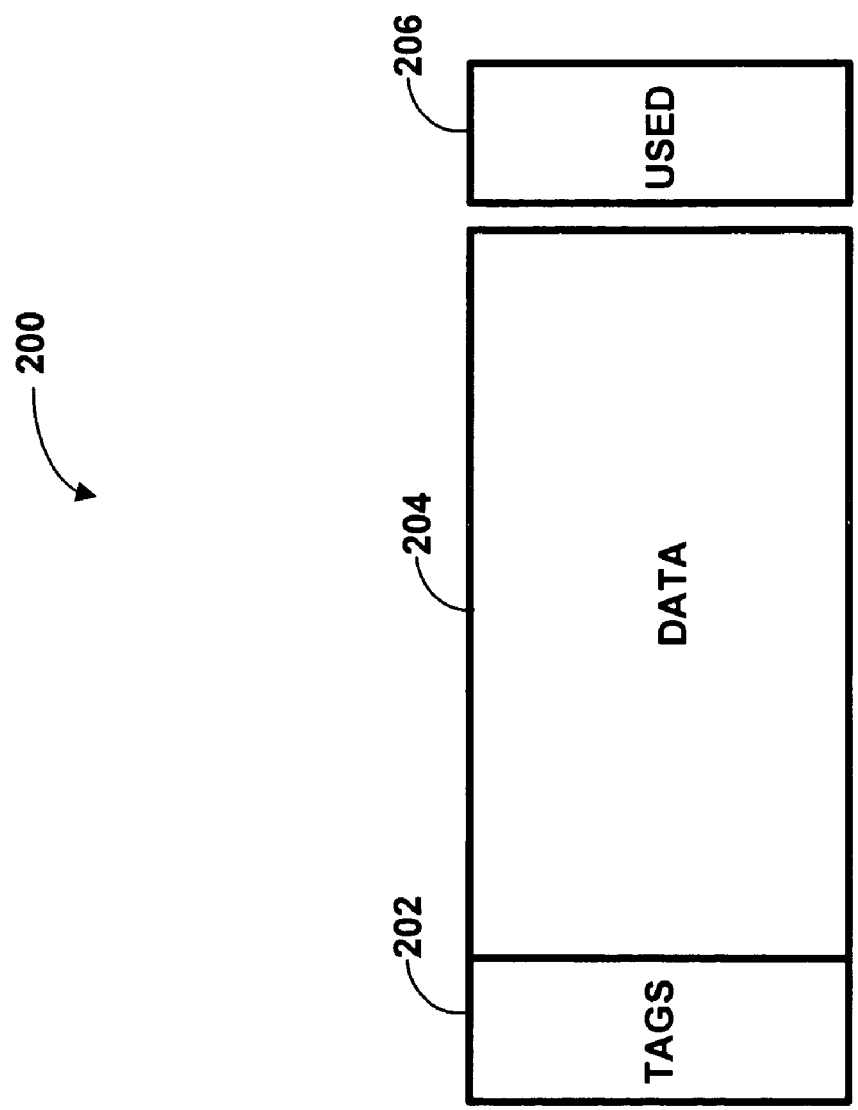
FIG. 2 is a functional block diagram of a cache topology that includes usage bits in accordance with one implementation of the present invention.

FIG. 2 is a functional block diagram of a cache topology that includes usage bits in accordance with one implementation of the present invention. The cache topology is directed to a hardware cache that is separated into tags 202, data 204, and used/usage bits 206.

The tags 202 and data 204 sections include normal tags and data found in all caches. The used section 206 is an additional section that includes an additional array of bits. These "usage bits", as referred to throughout the specification and claims, should not be confused with LRU bits that keep track of the order cache entries are used. The usage bits are set when a particular data item is fetched from or stored into the cache. In a typical implementation, each tag of the tag section 202 is associated with one line of data in the data section 204 the cache. The size of each line varies from machine to machine, depending on the cache being used. A typical size for a line of data within a cache is 128 bytes. The usage bits are "set" or "tripped" when the bits of data within the data section 204 of the cache are loaded. When the entry from the application is replaced, the usage bits corresponding to the entry are written from the cache. In one embodiment, the usage bits corresponding to the replaced entry are written to another location in memory for further analysis. Accordingly, the memory usage by the application is tracked by analyzing the usage bits that are set during an execution of the application. A more detailed description of the operation of this cache topology is provided below in the discussion of FIG. 4.

In one embodiment, selection may be made for the number of bytes in the data section 204 of the cache that correspond to each of the usage bits 206. The number of bytes of data that correspond to each usage bit is referred to as the "granularity" between the usage bits and the data. When the granularity is increased, each usage bit corresponds to a greater number of bytes of data. When the granularity is decreased, each usage bit corresponds to a fewer number of bytes of data.

For an example, consider a memory operation that is 32 bits (4 bytes) long. When a selection is made such that one usage bit corresponds to every 4 bytes (32 bits) in the cache, then with 128 byte lines, a line of usage bits in the "used" section of the cache 206 is 32 bits wide. At 32 bits wide, the space overhead in the cache required to accommodate the "used" section of the cache 206 is only about 3%. The granularity between the usage bits may be increased or decreased as desired. Increasing or decreasing the granularity effectively selects a level of space overhead for the usage bits within the cache. For example, when the granularity is increased to 128 data bits (16 bytes) per usage bit, the usage array is one byte (8 bits) wide and the space overhead is reduced to 0.7%. Beyond this, the granularity may be increased up to one usage bit per 128 byte cache line. However, the decrease in the space overhead is inversely proportional to detail level of the profile data received from the usage bits.

Figure 3:
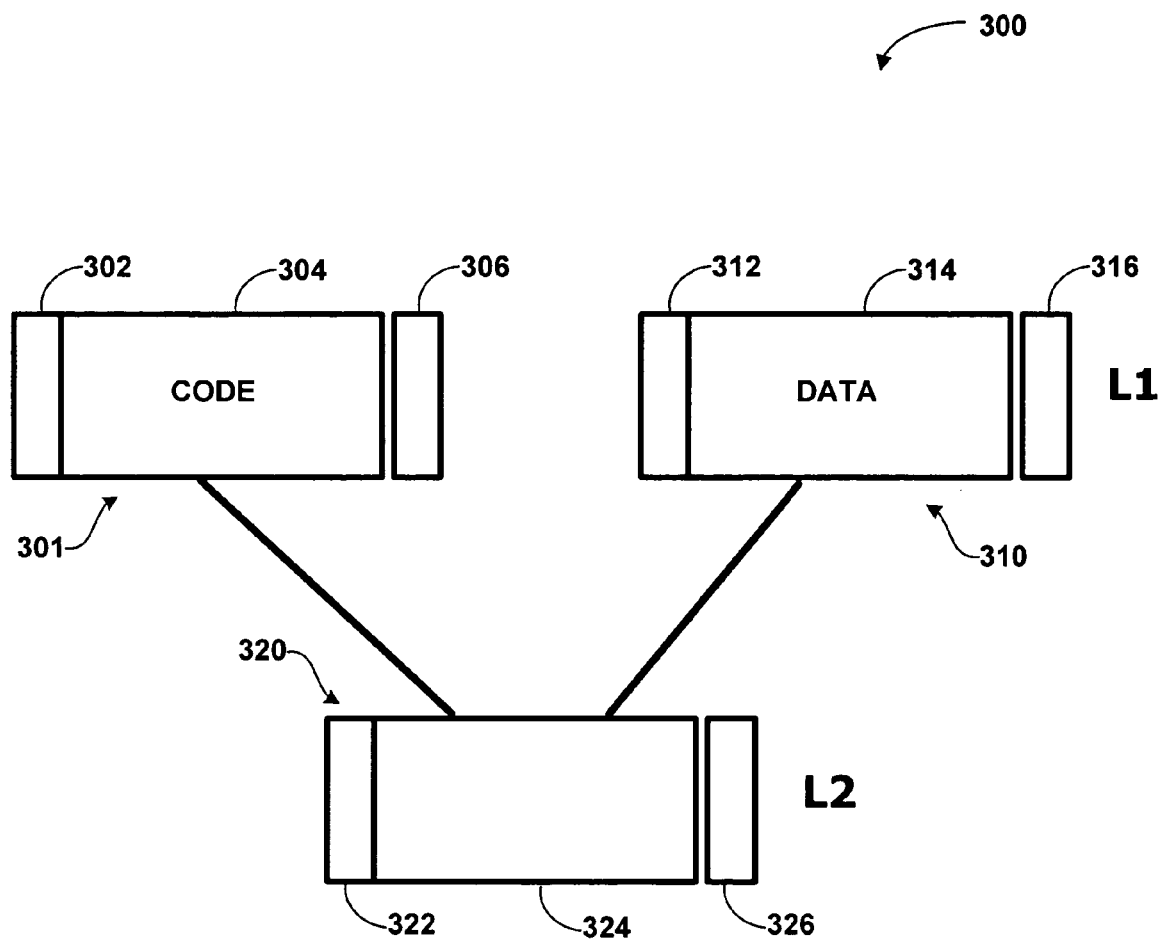
FIG. 3 is a functional block diagram of a multi-level cache topology that includes usage bits in accordance with another implementation of the present invention.

FIG. 3 is a functional block diagram of a multi-level cache topology that includes usage bits in accordance with another implementation of the present invention. The multi-level cache topology is directed to a hardware cache that is separated into an L1 cache and an L2 cache. In the example shown, the L1 cache is logically separated into a cache for storing code 301 and a cache for storing data 310 for executing applications. The cache for storing the code 301, storing the data 310, and the L2 cache are each separated into tags (e.g., 302, 312, 322), data/code (e.g., 304, 314, 324), and used/usage bits (e.g., 306, 316, 326).

When an entry is loaded into the L2 cache, the usage bits that correspond to entry stored in the L2 cache are set. When the entry is then loaded into the L1 cache from the L2 cache, the usage bits corresponding to the entry are also transferred to the L1 cache. Likewise, when the entry in the L1 cache is replaced, the usage information corresponding to the entry is also stored back into the L2 cache. Occasionally, for a non-inclusive cache, the transfer of the usage information back to the L2 cache may require the whole L1 entry to be stored into the L2 cache. A more detailed description of the operation of this multi-level cache topology is provided below in the discussion of FIG. 5.

The type of L1 cache shown is often referred to as a "Harvard Architecture" cache. A "Harvard Architecture" cache is split between a data cache (also called Dcache, which is the stuff to be computed) and an instruction cache (also called an Icache, which is the information about how the data is to be computed). Another cache architecture may be a "Unified" cache, which is where both data and instructions can be stored in the one cache. A Harvard Architecture cache is often chosen for bandwidth considerations, but a unified cache architecture or other architecture may be used without departing from the spirit or scope of the present invention.

Figure 4:
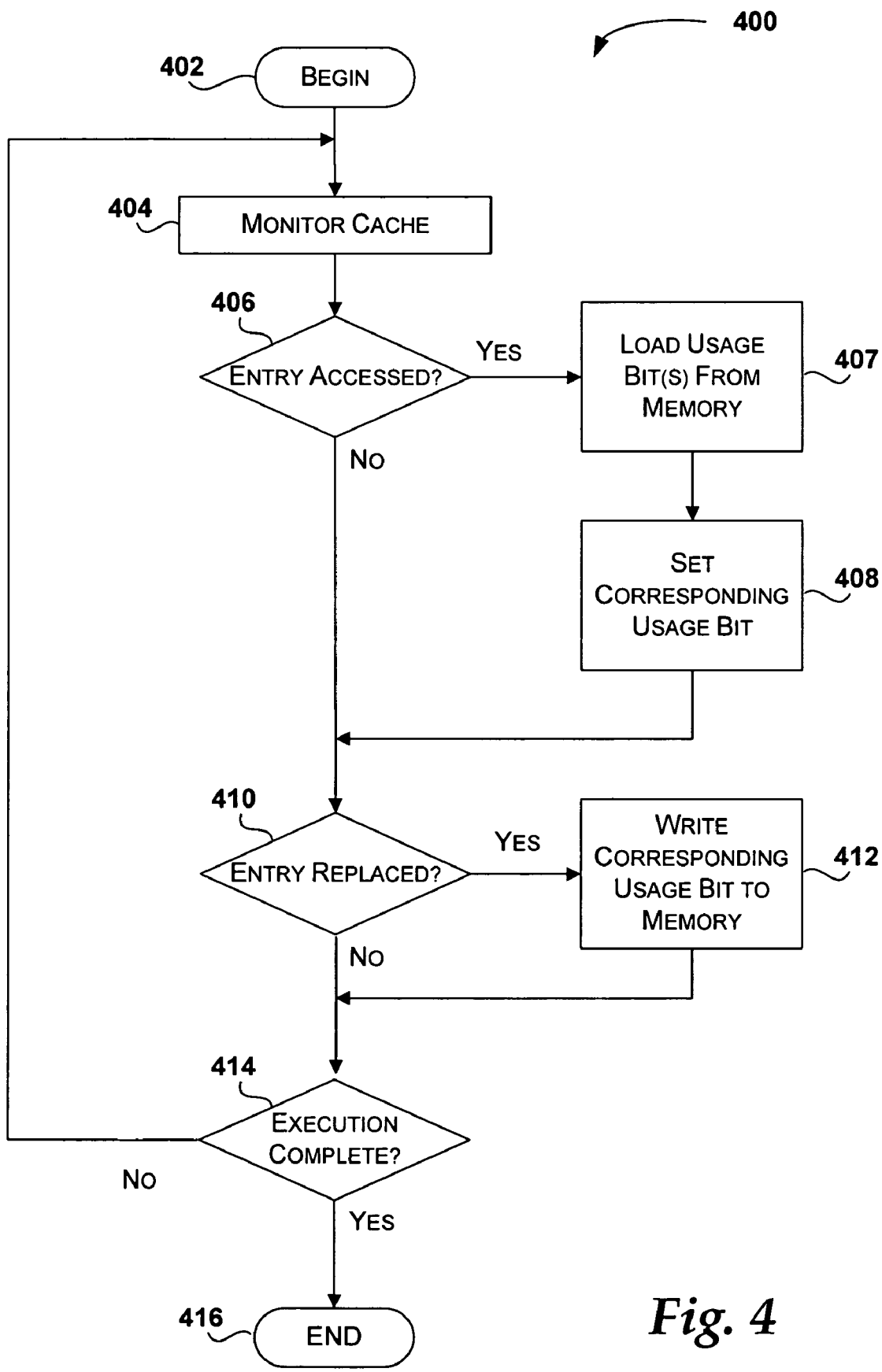
FIG. 4 is a logical flow diagram illustrating a process for collecting profile data of an application in accordance with one implementation of the present invention.

FIG. 4 is a logical flow diagram illustrating a process for collecting profile data of an application in accordance with one implementation of the present invention. Process 400 begins at block 402 where the computer application to be analyzed is initiated and any usage bits are reset for the new observation period. Processing continues at block 404.

At block 404, the data portion of the cache is monitored for activity that indicates that an entry of the application is either being fetched or stored. In one embodiment, activity of the cache may be monitored by a simple hardware connection that toggles one of the usage bits that corresponds to the bits in the cache being used. Processing continues at decision block 406.

At decision block 406, a determination is made whether an entry in the cache has been accessed. If the entry has not been accessed, processing advances to decision block 410. However, if the entry has been accessed, processing moves to block 407.

At block 407, the previous values of the usage bit that correspond to the cache entry are loaded from memory so that uses of the entry while it is in the cache are combined with the previous uses. In an alternative embodiment, the bits associated with the cache entry are zeroed when the cache entry is loaded from memory. Then, when the cache entry is replaced, the previous bits are loaded from memory, logically ORed with the current bits, and the combined result is stored back into memory. Once the previous bit is loaded, processing moves to block 408.

At block 408, the usage bit corresponding to the entry is set in response to the corresponding entry being accessed. It is appreciated that the usage bit may be set to a low logic level (logic "0") or a high logic level (logic "1") without departing from the spirit and scope of the invention. Once the usage bit is set, processing continues at decision block 410.

At decision block 410, a determination is made whether an entry in the cache is being replaced. In replacing an entry in the cache, the processor may randomly boot the entry from the cache, or the processor may look for the data that has not been used lately. Removing data that has not recently been used is often referred to as the least-recently-used (LRU) method. This method, as the name implies, boots out the information which has been needed the least of all the information in the cache. Typically, data is transferred in and out of the cache by a "cache-line". A cache-line is the amount of data transferred between the main memory and the cache by a cache-line fill or write-back operation. The size of the cache-line takes advantage of the principle called "spatial locality", which states that code that is close together is more likely to be executed together. Therefore, the larger the cache-line size, the more data that is close together, and therefore, likely related, is brought into the cache at any one time. The CPU (central processing unit) only requests a small piece of information, but it will get whatever other information is contained within the cache-line. If the cache is large enough, then it can easily contain the information within a large cache-line. However, if the cache is too small in comparison to the cache-line size, it can reduce performance (because sometimes, irrelevant information is in the cache-line, and takes up valuable space). If an entry of the cache is being replaced, processing moves to block 412. Alternatively, if an entry in the cache is not being replaced, processing advances to decision block 414.

At block 412, the usage bit corresponding to the replaced entry is written to memory. Writing the usage bit to memory ensures that the state of the usage bit corresponding to the entry is stored for future reference. Storing each of the usage bits provides the cache usage information to a database or table for future analysis of the application's performance. In one embodiment, an entry may be loaded and replaced many times. When an entry is loaded and replaced multiple times, the usage bits may be logically combined (e.g., a logical OR operation) with the previous usage bits for this section of memory. The usage bits may be stored in table according to the tag that corresponds to the data related to the usage bits. By storing the usage bits according to the corresponding tags, the resulting table maintains the organization of the data in the cache. Once the usage bit is stored, processing proceeds to decision block 414.

At decision block 414, a determination is made whether the execution of the application is complete. If the execution of the application is not complete, processing returns to block 404 where the monitoring of the cache is continued. Alternatively, if the execution of the application is complete, processing proceeds to block 416 where the process ends. Once process 400 is complete, the usage bits corresponding to the cache may be analyzed to determine the cache utilization of the application during execution. The cache utilization data of the application provides profile data that may be used to optimize the future cache utilization, and therefore future performance, of the application.

Figure 5:
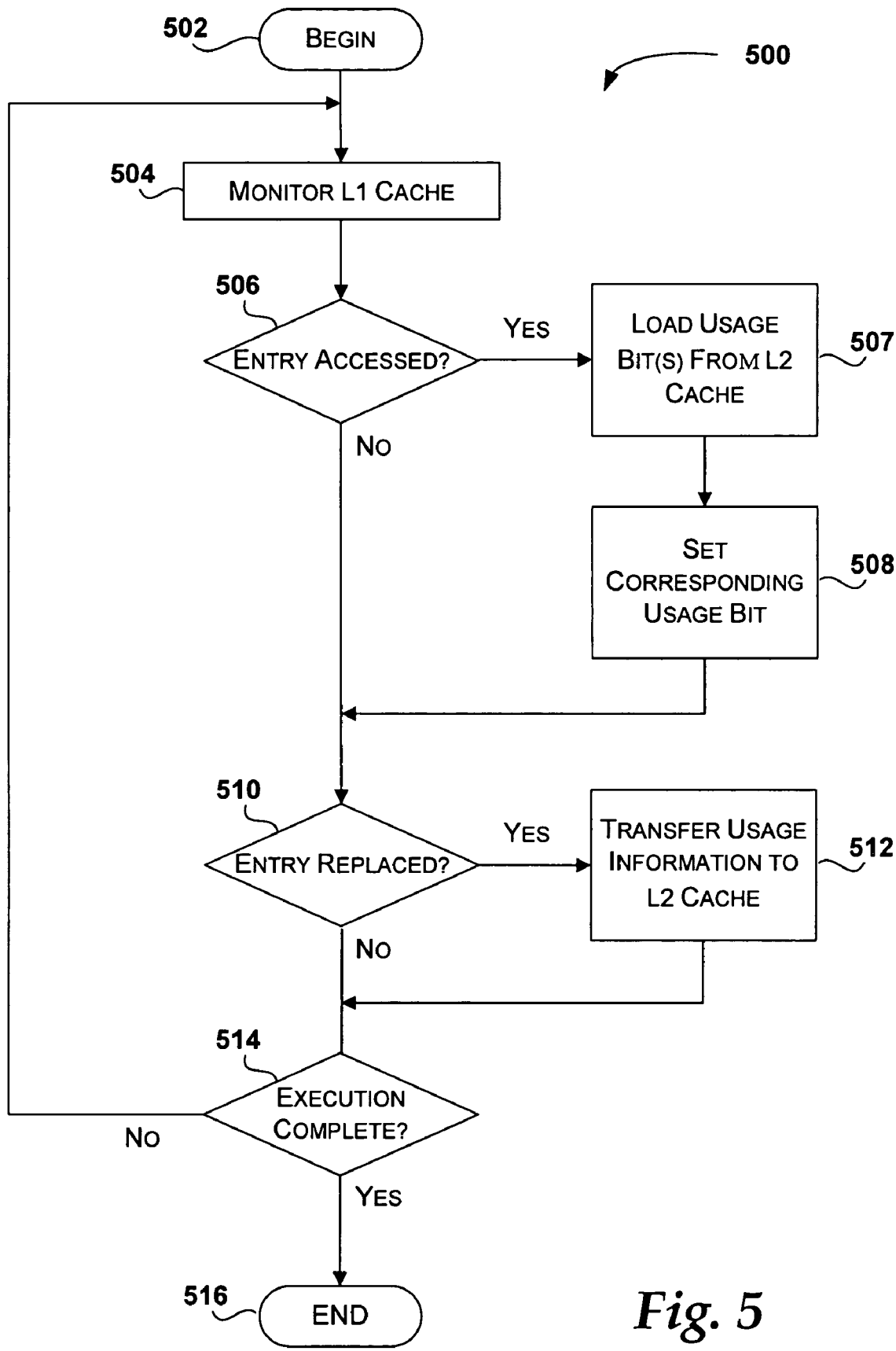
FIG. 5 is a logical flow diagram illustrating a process for collecting profile data of an application in accordance with another implementation of the present invention.

FIG. 5 is a logical flow diagram illustrating a process for collecting profile data of an application in accordance with another implementation of the present invention. Process 500 occurs for the L1 cache of a multi-level cache and begins at block 502 where the computer application to be analyzed is initiated and any usage bits are reset for the new observation period. The L2 cache of the multi-level cache architecture operates according to a process similar to process 400 described in FIG. 4 above. Processing continues at block 504.

At block 504, the L1 cache is monitored for activity that indicates that an entry of the application is either being fetched or stored. The data and/or code sections of the L1 cache are monitored similarly to monitoring method of block 404 of FIG. 4. Processing continues at decision block 506.

At decision block 506, a determination is made whether an entry in the L1 cache has been accessed. If the entry in the L1 cache has not been accessed, processing advances to decision block 510. However, if the entry in the L1 cache has been accessed, processing moves to block 507.

At block 507, the previous values of the usage bit that correspond to the cache entry are loaded from the L2 cache so that uses of the entry while it is in the cache are combined with the previous uses. In an alternative embodiment, the bits associated with the cache entry are zeroed when the cache entry is loaded from the L2 cache. Then, when the cache entry is replaced, the previous bits are loaded from L2 cache, logically ORed with the current bits, and the combined result is stored back into the L2 cache. Once the previous bit is loaded, processing moves to block 508.

At block 508, the usage bit corresponding to the entry stored is set in response to the corresponding entry being accessed. Once the usage bit is set, processing continues at decision block 510.

At decision block 510, a determination is made whether an entry in the L1 cache is being replaced. An entry may need to be replaced in the cache when the cache is full. Replacement of an entry in the L1 cache occurs similarly as replacement of an entry in the cache described in connection with decision block 410 of FIG. 4 above. If an entry of the L1 cache is being replace, processing moves to block 512. Alternatively, if an entry in the L1 cache is not being replaced, processing advances to decision block 514.

At block 512, the usage bit corresponding to the replaced entry is transferred back to the L2 cache. By transferring the usage bit corresponding to the replaced entry back to the L2 cache, the overhead associated with a memory write operation is avoided in the L1 cache (see block 412 of FIG. 4). In one embodiment, for a non-inclusive cache, the whole L1 cache entry may also be stored into the L2 cache on occasion. Once the usage bit transferred to the L2 cache, processing proceeds to decision block 514.

At decision block 514, a determination is made whether the execution of the application is complete. If the execution of the application is not complete, processing returns to block 504 where the monitoring of the L1 cache is continued. Alternatively, if the execution of the application is complete, processing proceeds to block 516 where the process ends. Once process 500 is complete, the usage bits corresponding to the cache may be analyzed to determine the cache utilization and memory utilization of the application during execution. The cache utilization data of the application provides profile data that may be used to optimize the future cache utilization, and therefore future performance, of the application.

The present invention as described in FIGS. 2-5 provide an optimization method for applications that allows the collection of full cache utilization information without requiring an instrumented build. The profile data collection may be run at nearly full speed while enabling collection of more complete user data for better optimization results. The collection of the profile data also occurs during actual use to be compared with existing testing scenarios. The method provides information to implement dynamic methods of managing memory during the execution of the program.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A computer-readable storage medium having computer-executable components with instructions for collecting memory utilization information, the instructions comprising:
    initiating an application, wherein initializing the application includes starting a new observation period where profile data is to be collected for the application;
    assigning usage bits to predetermined sections of an L1 cache;
    determining whether entries stored in the L1 cache are accessed;
    setting each of the usage bits when the entries accessed in the L1 cache corresponds to the predetermined sections corresponding to each of the usage bits;
    determining whether at least one entry in the cache is replaced;
    transferring the usage bits that correspond to the predetermined sections of the L1 cache that include entries replaced to an L2 cache; and
    analyzing the stored usage bit to determine the usage of the memory since the application was initiated.

2. The computer-readable storage medium of claim 1, wherein the cache is arranged to include a section for storing tags, a section for storing data, and a section for storing usage bits.

3. The computer-readable storage medium of claim 2, wherein a number of usage bits stored in the section for storing usage bits is selectable.

4. The computer-readable storage medium of claim 1, wherein the cache is arranged according to a Harvard architecture.

5. The computer-readable storage medium of claim 1, wherein the cache is arranged according to a unified architecture.

6. A computer-readable storage medium encoded with computer-executable instructions for performing a method that collects profile data of an application, the method comprising:
    initiating the application, wherein initializing the application includes starting a new observation period where profile data is collected for the application;
    determining whether an entry in a cache is accessed that is associated with the application;
    setting a usage bit corresponding to a subset of the entry when the subset of the entry in the cache is accessed;
    determining whether the entry is replaced;
    storing the usage bit in a separate location from the cache when the entry in the cache is replaced; and
    analyzing the stored usage bit to determine the memory usage by the application since the application was initiated.

7. The computer-readable storage medium of claim 6, wherein multiple usage bits correspond to each entry in the cache.

8. The computer-readable storage medium of claim 6, wherein the cache is arranged to include a section for storing tags, a section for storing data, and a section for storing usage bits.

9. The computer-readable storage medium of claim 8, wherein a number of usage bits stored in the section for storing usage bits is selectable.

10. The computer-readable storage medium of claim 8, wherein a granularity between a number of usage bits stored in the section for storing usage bits and a number of bits associated with a cached-line in the section for storing data is selectable.

11. The computer-readable storage medium of claim 6, wherein the separate location from the cache is a table that is arranged for storing usage information.

12. The computer-readable storage medium of claim 6, wherein the cache is an L1 cache and the separate location from the cache is an L2 cache.

13. The computer-readable storage medium of claim 6, wherein the cache is an L1 cache and storing the usage bit in a separate location from the cache further comprises transferring the usage bit to the L2 cache.

14. The computer-readable storage medium of claim 6, wherein the cache is arranged according to a Harvard architecture.

15. The computer-readable storage medium of claim 6, wherein the cache is arranged according to a unified architecture.

16. A computer-readable storage medium encoded with computer-executable instructions for performing a method that collects profile information of an application, the method comprising:
    initiating the application, wherein initializing the application includes starting a new observation period where profile data is collected for the application;
    assigning a usage bit to a predetermined section of a cache;
    determining whether an entry stored in the cache is accessed that is associated with the application;
    setting the usage bit corresponding to the predetermined section of the cache when the accessed entry in the cache corresponds to the predetermined section;
    determining whether the entry in the cache is replaced;

storing the usage bit corresponding to the predetermined section in a separate location from the cache when the entry in the cache is replaced; and analyzing the stored usage bit to determine the usage of the memory by the application since the initiating of the application.

17. The computer-readable storage medium of claim 16, wherein the cache is arranged to include a section for storing tags, a section for storing data, and a section for storing usage bits.

18. The computer-readable storage medium of claim 17, wherein a number of usage bits stored in the section for storing usage bits is selectable.

19. The computer-readable storage medium of claim 17, wherein a granularity between a number of usage bits stored in the section for storing usage bits and a number of bits associated with a cached-line in the section for storing data is selectable.

20. The computer-readable storage medium of claim 16, wherein the separate location from the cache is a table that is arranged for storing usage information.

21. The computer-readable storage medium of claim 16, wherein the cache is an L1 cache and the separate location from the cache is an L2 cache.

22. The computer-readable storage medium of claim 16, wherein the cache is an L1 cache and storing the usage bit in a separate location from the cache further comprises transferring the usage bit to the L2 cache.

* * * * *